(No Model.)  2 Sheets—Sheet 1.

J. SHANNON.
POTATO DIGGER.

No. 288,875.  Patented Nov. 20, 1883.

WITNESSES:
Francis McArdle.
C. Sedgwick.

INVENTOR:
J. Shannon
BY Munn & Co.
ATTORNEYS.

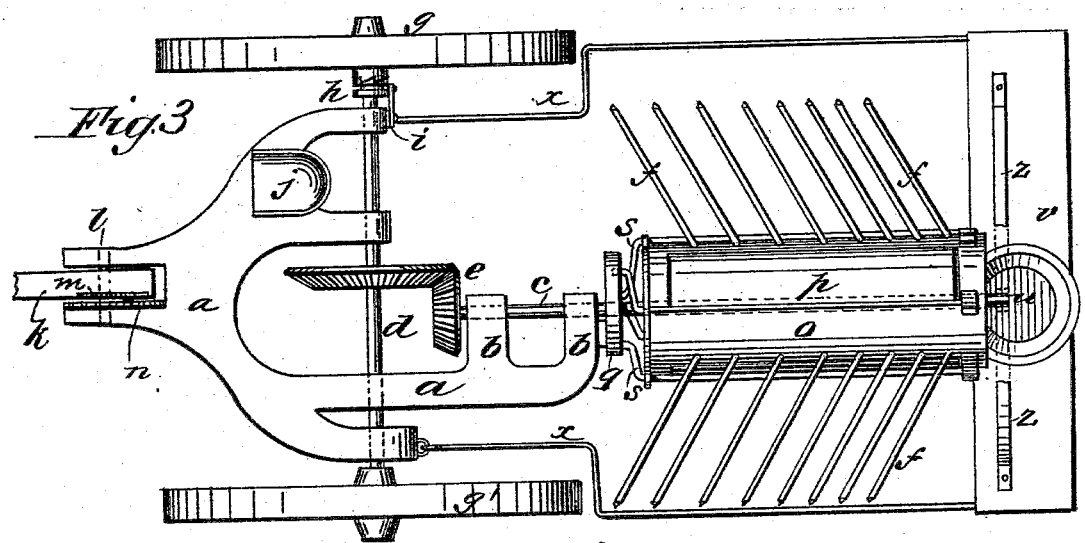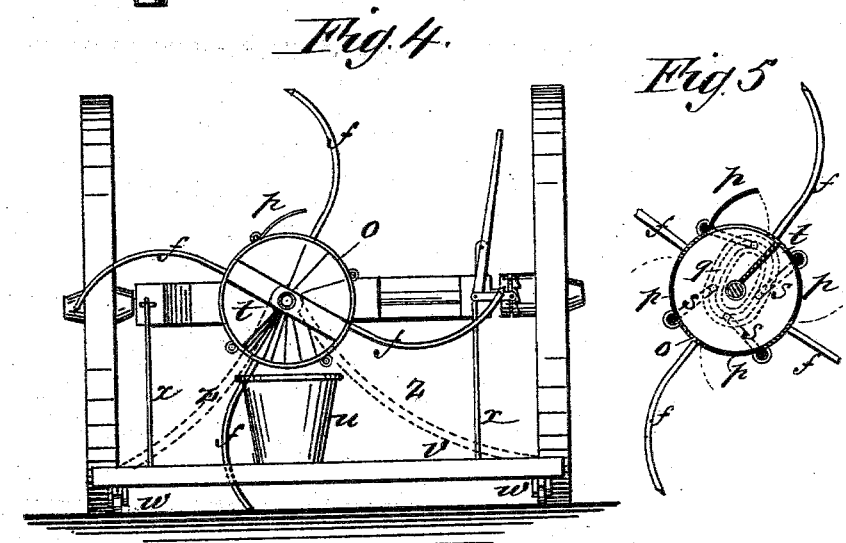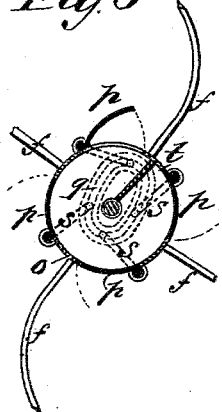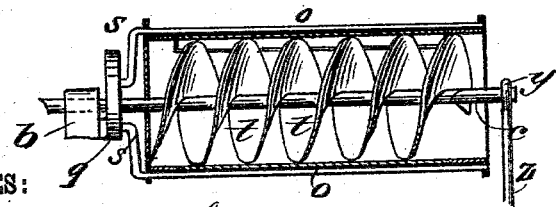

UNITED STATES PATENT OFFICE.

JOHN SHANNON, OF WIXOM, MICHIGAN.

POTATO-DIGGER.

SPECIFICATION forming part of Letters Patent No. 288,875, dated November 20, 1883.

Application filed July 14, 1883. (No model.)

*To all whom it may concern:*

Be it known that I, JOHN SHANNON, of Wixom, in the county of Oakland and State of Michigan, have invented a new and Improved Potato-Digger, of which the following is a full, clear, and exact description.

This invention pertains to improvements in potato-diggers; and it consists of the several hereinafter described and claimed combinations of parts.

Reference is to be had to the accompanying drawings, forming part of this specification, in which similar letters of reference indicate corresponding parts in all the figures.

Figure 1:
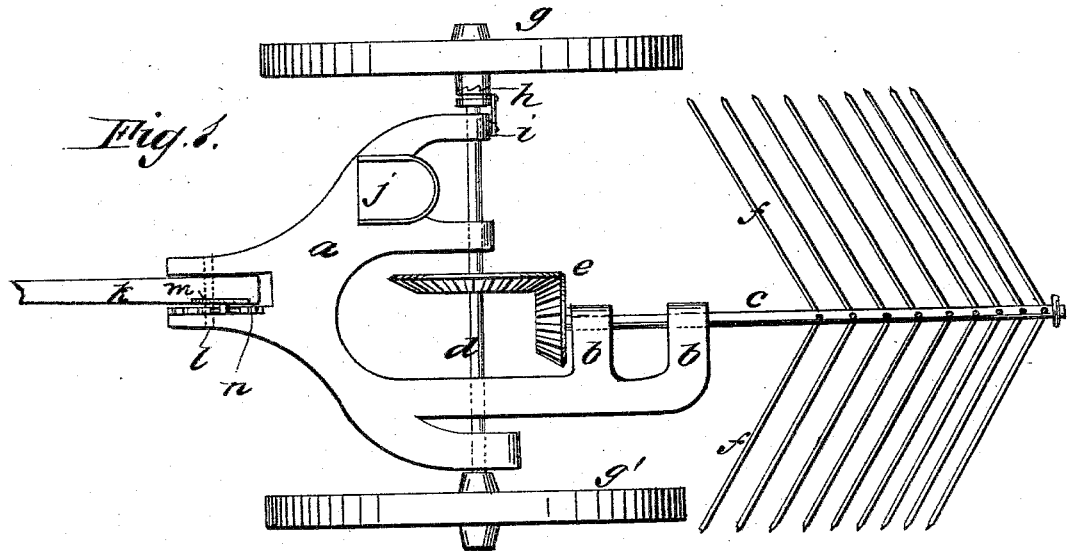
Figure 2:
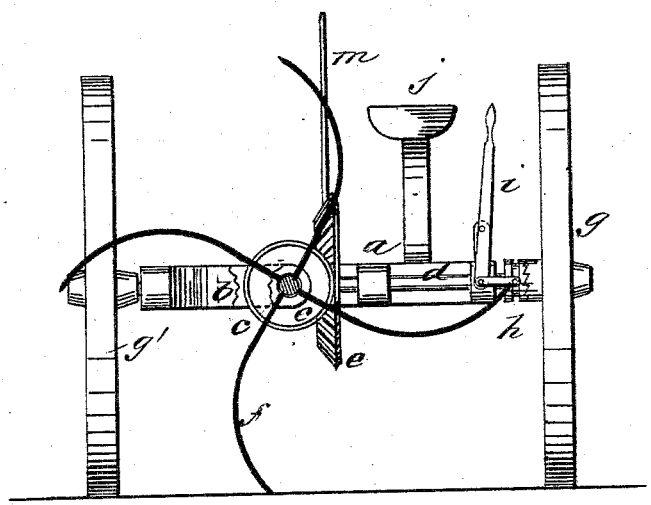

Figure 1 is a plan view of my improved digger without the gathering attachment, and Fig. 2 is a rear end elevation of the same. Fig. 3 is a plan view of the machine with the gathering attachment. Fig. 4 is an end elevation of the same. Fig. 5 is a detail of the gathering device in cross-section of the conveyer, and Fig. 6 is a horizontal section of the conveyer of the gathering attachment.

I contrive the bed-frame $a$ of a two-wheeled truck with bearers $b$ to support a digger-shaft, $c$, so as to project rearward of the axle $d$, with which the digger-shaft is geared by wheels $e$, said shaft being armed with curved prongs or teeth $f$, to be thrust into the ground at the points, as the shaft rotates, to dig up the potatoes and deliver them on the surface in about the same manner as they are dug by a fork.

Besides curving the teeth, as in Fig. 2, which is a better form for the purpose than straight teeth, I also propose to incline them forward, as represented in Fig. 1, whereby they will be drawn pointwise to some extent into the ground, thus enabling them to enter the ground better and more easily than if projecting at right angles to the shaft $c$.

It is designed to have about eight teeth in each set or row, in which the hinder teeth will be placed closer together than the forward teeth, the object being to have the forward teeth first pass through the ground and dig up the larger potatoes, to be followed by the finer set of teeth of the next row, passing through the same ground to dig the smaller potatoes, for more effectual work than if the ground were only dug once. The digger-shaft will revolve about twice as fast as the axle.

The axle $d$ is to be connected with wheel $g$ by a clutch, $h$, to be revolved by said wheel when it is to be operated, and to be disconnected when it is not desired that the digger shall rotate. A lever, $i$, is connected with the clutch for operating it, and said lever is arranged in suitable proximity to the driver's seat $j$, to enable him to operate said lever at will when sitting on the seat. The wheel $g'$ turns loosely on the axle.

For the purpose of tilting up the digger to enable it to be carried over the ground, the truck-frame $a$ and the tongue $k$ are pivoted together at $l$, and there is a lever, $m$, attached to the tongue, and a notched holding plate or rack, $n$, attached to frame $a$, in which the lever $m$ may be fastened at any point by a latch, to hold up the digger or let it down into the ground, as may be required.

For the gathering attachment I arrange the tube $o$ in the axis of the digger-teeth, with a door, $p$, in front of each set of teeth, which is to be opened by a grooved cam, $q$, and an arm, $s$, each time the teeth pass in the upper portion of their travel, so that the potatoes will roll down the teeth into the tube $o$, after which the doors close again to retain the potatoes against escape by the rotation of the tube $o$, to be discharged out of the rear end of the tube by screw-conveyer $t$, arranged within the tube.

At the end out of which the potatoes are to be discharged there is a basket, $u$, that is carried on a platform, $v$, which is drawn behind on caster-wheels $w$ by rods $x$, attached to the axle or bed $a$, the rods being bent down low directly from the axle to prevent the teeth $f$ from striking them. The cam-disk $q$ is to be attached to beam $b$, so that it will not revolve, in order that its groove will open and close the covers $p$ at the right point.

It is designed in practice to have the platform $v$ connected with the rear end of the shaft $c$ by any suitable rod, $z$, attached to the platform, and having an eye, $y$, for the shaft, principally for the purpose of lifting the platform by the shaft $c$ through the lever $m$ to turn the machine about at the sides of the field. The basket will be taken off from time to time by the driver, to be emptied at the places prepared for receiving the potatoes.

In the gathering device the teeth $f$ are to be attached to the tube, instead of to the shaft, as in the simple digger device. The tube is to have holes for the purpose of sifting out the dirt.

Having thus described my invention, I claim as new and desire to secure by Letters Patent—

1. In a potato-digger, the combination, with the shaft, of the series of forwardly-inclined curved teeth with the individual front teeth spaced wide apart, while the rear teeth are spaced closer together, as shown and described, and for the purpose set forth.

2. The combination of the gathering-tube $o$, having doors $p$ to open for reception of the potatoes and to close for retaining them, with the stationary grooved cam $q$, arms $s$, which connect with the doors $p$, and are adapted to engage with the cam, and the rotating teeth $f$, substantially as described.

3. The combination of the conveyer-screw $t$ and the gathering-tube $o$, having doors connected to arms operated by a grooved cam, with the rotating teeth $f$, as specified.

4. The tube $o$, doors $p$, arms $s$, and grooved cam $q$, in combination with the rotating teeth $f$, substantially as described.

5. The platform $v$, in combination with the truck-frame $a$, teeth $f$, and the gathering-tube and conveyer, said platform being connected to the shaft $c$ by a rod, $z$, having an eye, $y$, fitting on the shaft, substantially as described.

JOHN SHANNON.

Witnesses:
J. R. RAUCH,
J. L. SIBLEY.